(12) United States Patent
Veerasamy

(10) Patent No.: US 6,491,987 B2
(45) Date of Patent: Dec. 10, 2002

(54) PROCESS FOR DEPOSITING DLC INCLUSIVE COATING WITH SURFACE ROUGHNESS ON SUBSTRATE

(75) Inventor: Vijayen S. Veerasamy, Farmington Hills, MI (US)

(73) Assignee: Guardian Indusries Corp., Auburn Hills, MI (US)

( * ) Notice: Subject to any disclaimer, the term of this patent is extended or adjusted under 35 U.S.C. 154(b) by 0 days.

(21) Appl. No.: 09/897,049

(22) Filed: Jul. 3, 2001

(65) Prior Publication Data

US 2001/0051273 A1 Dec. 13, 2001

Related U.S. Application Data

(60) Division of application No. 09/557,319, filed on Apr. 25, 2000, now Pat. No. 6,284,377, which is a continuation-in-part of application No. 09/442,805, filed on Nov. 18, 1999, now Pat. No. 6,338,901, which is a continuation-in-part of application No. 09/303,548, filed on May 3, 1999, now Pat. No. 6,261,693.

(51) Int. Cl.⁷ .............................................. C23C 16/26
(52) U.S. Cl. ..................... 427/523; 427/249.7; 427/165
(58) Field of Search .......................... 427/249.1, 249.7, 427/249.8, 577, 534, 523, 165

(56) References Cited

U.S. PATENT DOCUMENTS

| | | | |
|---|---|---|---|
| 4,210,431 A | 7/1980 | Bachman et al. | |
| 4,263,350 A | 4/1981 | Valimont | |
| 4,495,263 A | 1/1985 | VanderValk | |
| RE32,272 E | 10/1986 | Funaki | |
| 4,666,802 A | 5/1987 | Hung et al. | |
| 4,816,291 A | 3/1989 | Desphandey et al. | |
| 4,965,156 A | 10/1990 | Hotomi et al. | |
| 4,981,717 A * | 1/1991 | Thaler ........................ | 427/577 |
| 5,000,831 A | 3/1991 | Osawa et al. | |
| 5,098,737 A | 3/1992 | Collins et al. | |
| 5,143,963 A | 9/1992 | Sterling | |
| 5,352,493 A | 10/1994 | Dorfman et al. | |
| 5,378,527 A | 1/1995 | Nakanishi et al. | |
| 5,401,316 A | 3/1995 | Shiraishi et al. | |
| 5,415,927 A | 5/1995 | Hirayama et al. | |
| 5,437,894 A | 8/1995 | Ogawa et al. | |
| 5,455,081 A | 10/1995 | Okada et al. | |
| 5,508,368 A | 4/1996 | Knapp et al. | |
| 5,580,605 A | 12/1996 | Ogawa et al. | |
| 5,614,574 A | 3/1997 | Sheth | |
| 5,616,179 A | 4/1997 | Baldwin et al. | |
| 5,624,718 A | 4/1997 | Dearnaley | |
| 5,635,258 A | 6/1997 | Chen et al. | |
| 5,637,353 A | 6/1997 | Kimock et al. | |
| 5,653,812 A | 8/1997 | Petrmichl et al. | |
| 5,665,424 A | 9/1997 | Sherman | |
| 5,679,269 A | 10/1997 | Cohen | |
| 5,718,976 A | 2/1998 | Dorfman | |
| 5,731,046 A * | 3/1998 | Mistry et al. ............. | 427/249.7 |
| 5,776,603 A | 7/1998 | Zagdoun et al. | |
| 5,795,648 A | 8/1998 | Goel et al. | |
| 5,800,918 A | 9/1998 | Chartier et al. | |
| 5,814,194 A * | 9/1998 | Deguchi et al. ............. | 427/450 |
| 5,846,649 A | 12/1998 | Knapp et al. | |
| 5,858,477 A * | 1/1999 | Veerasamy et al. ...... | 427/249.7 |
| 5,876,753 A | 3/1999 | Timmons et al. | |
| 5,888,593 A | 3/1999 | Petrmichl et al. | |
| 5,900,342 A | 5/1999 | Visser et al. | |
| 5,958,601 A | 9/1999 | Salsman | |
| 5,958,996 A | 9/1999 | Egitto et al. | |
| 5,965,629 A | 10/1999 | Jung et al. | |
| 5,989,693 A | 11/1999 | Yamasaki et al. | |
| 6,046,758 A | 4/2000 | Brown et al. | |
| 6,096,149 A * | 8/2000 | Hetrick et al. ............. | 427/249.1 |
| 6,183,818 B1 * | 2/2001 | Vohra et al. ............. | 427/249.8 |
| 6,261,693 B1 | 7/2001 | Veerasamy | |
| 6,280,834 B1 | 8/2001 | Veerasamy et al. | |
| 6,284,377 B1 | 9/2001 | Veerasamy | |
| 6,303,225 B1 | 10/2001 | Veerasamy | |
| 6,303,226 B2 | 10/2001 | Veerasamy | |
| 6,312,808 B1 | 11/2001 | Veerasamy et al. | |

FOREIGN PATENT DOCUMENTS

| | | |
|---|---|---|
| EP | 0 499 287 A1 | 8/1992 |
| EP | 0810186 A * | 12/1997 |
| EP | 1043380 A * | 10/2000 |
| FR | 2 756 276 | 5/1998 |
| JP | 10-158038 | 6/1998 |
| JP | 11-171592 | 6/1999 |
| WO | WO 00/64829 | 11/2000 |
| WO | WO 01/36342 | 5/2001 |

OTHER PUBLICATIONS

"Highly Tetrahedral, Diamond–Like Amorphous Hydrogenated Carbon Prepared from a Plasma Beam Source", Weiler et al., May 1994, pp. 2797–2799.

"Deposition of Carbon Films by a Filtered Cathodic Arc", Kuhn et al., Aug. 1993, pp. 1350–1354.

"Optical and Electronic Properties of Amorphous Diamond", Veerasamy et al., Apr. 1993, pp. 782–787.

"Preparation and Properties of Highly Tetrahedral Hydrogenated Amorphous Carbon", Weiler et al., Jan. 1996, pp. 1594–1607 Physical Review B vol. 53, No. 3.

"Gaseous Precursors of Diamond–Like Carbon Films: Chemical Composition of $CH_4$/Ar Plasmas", Riccardi et al., pp. 211–215, Vacuum 61 (2001).

"Electronic Density of States in Highly Tetrahedral Amorphous Carbon", Veerasamy et al., Solid State Electronics vol. 37 No. 2 1994 pp. 319–326.

"Properties of Ion Beam Deposited Tetrahedral Fluorinated Amorphous Carbon Films (ta–C), Ronning et al., Mat. Res. Soc. Symp. Proc. vol. 593, pp. 335–340 (2000)."

"Fluorinated Diamond Like Carbon Films Produced by Plasma Immersion Ion Processing Technique, Hakovirta et al., Mat. Res. Soc. Symp. Proc. vol. 593, pp. 285–290 (2000)."

* cited by examiner

Primary Examiner—Bret Chen
(74) Attorney, Agent, or Firm—Nixon & Vanderhye P.C.

(57) ABSTRACT

A process for depositing a diamond-like carbon (DOC) inclusive layer having surface roughness on a substrate is provided. The surface roughness of the DOC inclusive layer improves hydrophobicity, and is thus advantageous in certain instances. In certain embodiments, the layer has an initial contact angle of at least 100 degrees, a surface energy of no more than about 20.2 mN/m, and/or an average hardness of at least about 10 GPa.

9 Claims, 5 Drawing Sheets

PROCESS FOR DEPOSITING DLC INCLUSIVE COATING WITH SURFACE ROUGHNESS ON SUBSTRATE

This application is a division of application Ser. No. 09/557,319 filed Apr. 25, 2000 now U.S. Pat. No. 6,284,377, which is a CIP of 09/442,805 filed Nov. 18, 1999 now U.S. Pat. No. 8,338,401, which is a CIP of 09/303,548 filed May 3, 1999 now U.S. Pat. No. 6,261,645, the entire content of which is hereby incorporated by reference in this application.

BACKGROUND OF THE INVENTION

Conventional soda inclusive glasses are susceptible to environmental corrosion which occurs when sodium (Na) diffuses from or leaves the glass interior, as well as to retaining water on their surfaces in many different environments, including when used as automotive windows (e.g. backlites, side windows, and/or windshields). When water is retained or collects on automotive windows, the water may freeze (i.e. forming ice) in certain environments. The more water retained on a windshield, the higher power wiper motor(s) and/or wiper blade(s) required.

In view of the above, it is apparent that there exists a need in the art for (i) a coated article (e.g. coated glass or plastic substrate) that can repel water and/or dirt, and a method of making the same, (ii) a coated soda inclusive glass where the coating(s) reduces the likelihood of visible stains/corrosion forming; and/or (iii) a protective hydrophobic coating for window substrates that is somewhat resistant to scratching, damage, or the like.

It is known to provide diamond like carbon (DOC) coatings on glass. U.S. Pat. No. 5,637,353, for example, states that DOC may be applied on glass. Unfortunately, the DOC of the '353 patent would not be an efficient hydrophobic coating and/or would not be an efficient corrosion minimizer on glass in many instances.

U.S. Pat. No. 5,900,342 to Visser et al. discloses a fluorinated DOC layer on an electrophotographic element. From about 25–65% fluorine content by atomic percentage is provided at an outermost surface, to provide for low surface energy in an attempt to make removal of xerographic toner easier. Unfortunately, this DOC inclusive layer of the '342 patent would be too soft for use on a glass substrate in automotive applications and the like. Its apparent lack of $sp^3$ C—C bonds contribute to its softness. It is believed that continuous exposure to sun, rain, humidity, dust, windshield wipers, and/or the environment in general would cause the '342 DOC layer to break down or degrade rather quickly and/or substantially over time.

Thus, there also exists a need in the art for a DOC inclusive layer that has sufficient hardness and durability to withstand the environment while still exhibiting satisfactory hydrophobic qualities.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a durable coated article that can shed or repel water (e.g. automotive windshield, automotive backlite, automotive side window, architectural window, etc.).

Another object of this invention is to improve the hydrophobic nature of a coated article by utilizing a surface (exterior and/or interior surface) having roughness such as defined by peaks and/or valleys. The formation or provision of nanostructures or other roughness on the surface results in an exterior surface of the coated article having both segments of solid material and segments of voids or air. Because liquids have high contact angles θ in air (e.g., water's contact angle θ in air approaches 180 degrees), the provision of the voids at the surface of the coated article due to the nanostructures allows the coated article to exhibit increased and/or high contact angles θ, and thus be hydrophobic in nature. The nanostructures may be randomly or uniformly positioned in different embodiments.

Another object of this invention is to provide a coated article including a surface including roughness such that the average height or elevation "d" (i.e., "d" is measured from the bottom of a valley to the top of an adjacent peak) is from about 5 to 60 nm, more preferably from about 10–30 nm.

Another object of this invention is to provide a coated article with a surface including nanostructures dimensioned such that the average lateral spacing or gap "g" between adjacent nanostructures (i.e., "g" is measured from the peak of one nanostructure to the peak of an adjacent nanostructure) is from about 10–100 nm, more preferably from about 10–50 nm.

The aforesaid surface(s) may be: (i) an exterior surface of the coated article, (ii) a surface of an underlying substrate, such as a glass substrate, on which a coating(s) is to be provided, and/or (iii) a surface of an intermediate layer provided between the underlying substrate and an exterior diamond-like carbon (DOC) inclusive layer.

Another object of this invention is to provide a coated article, wherein a layer of the coating includes $sp^3$ carbon-carbon bonds and has a wettability W with regard to water of less than or equal to about 23 mN/m, more preferably less than or equal to about 21 mN/m, and most preferably less than or equal to about 20 mN/m, and in most preferred embodiments less than or equal to about 19 mN/meter. This can also be explained or measured in Joules per unit area $(mJ/m^2)$.

Another object of this invention is to provide a coated article, wherein a layer of the coating includes $sp^3$ carbon-carbon bonds and has a surface energy $\gamma_c$ of less than or equal to about 20.2 mN/m, more preferably less than or equal to about 19.5 mN/m, and most preferably less than or equal to about 18 mN/m.

Another object of this invention is to provide a coated article, wherein a DOC inclusive layer of the coating has an initial (i.e. prior to being exposed to environmental tests, rubbing tests, acid tests, UV tests, or the like) water contact angle θ of at least about 100 degrees, more preferably of at least about 120 degrees, even more preferably of at least about 130 degrees, and most preferably of at least about 145 degrees. The article's initial contact angle θ may be as high as 175 degrees in certain embodiments. In certain embodiments the article's contact angle may increase over time upon exposure to environmental elements (as graphitic $sp^2$ C—C bonds wear off) while in other embodiments the article's contact angle may decrease over time upon such exposure.

Another object of this invention is to provide a DOC inclusive layer for coating on a substrate, wherein at least about 15% (more preferably at least about 25%, and most preferably at least about 30%) of the bonds in a DOC inclusive layer are $sp^3$ carbon-carbon (C—C) bonds; and wherein the DOC inclusive layer includes by atomic percentage at least about 5% hydrogen (H) atoms (more preferably at least about 10% and most preferably at least about 15%) taking into consideration either the DOC inclusive layer's entire thickness or only a thin layer portion thereof (i.e., the layer is hydrogenated). In certain embodiments, an increased percentage of H atoms may be provided near the DOC inclusive layer's outermost or exterior surface (e.g., outermost 10 angstroms of the layer) to be contacted by water or the like.

Another object of this invention is to provide a coating for a glass substrate, wherein a DOC inclusive layer of the coating includes a greater number of $sp^3$ carbon-carbon (C—C) bonds than $sp^2$ carbon-carbon (C—C) bonds.

Another object of this invention is to provide a coated glass article that is abrasion resistant.

Yet another object of this invention is to fulfill any or all of the above listed objects and/or needs.

Generally speaking, this invention fulfills any or all of the above described needs or objects by providing a coated article comprising:

a substrate;

a hydrophobic layer including diamond-like carbon (DOC) and $sp^3$ carbon-carbon bonds provided on said substrate; and wherein an exterior surface of said hydrophobic layer has a roughness sufficient such that the hydrophobic layer has an initial contact angle $\theta$ with a sessile drop of water thereon of at least about 100 degrees.

This invention further fulfills any or all of the above described needs and/or objects by providing a method of making a coated article comprising the steps of:

providing a substrate; and depositing a hydrophobic layer including $sp^3$ carbon-carbon bonds on the substrate over top of a surface having a roughness so that the resulting layer including $sp^3$ carbon-carbon bonds has a roughness at an exterior surface thereof sufficient such that the hydrophobic layer has an initial contact angle $\theta$ with a sessile drop of water thereon of at least about 100 degrees.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
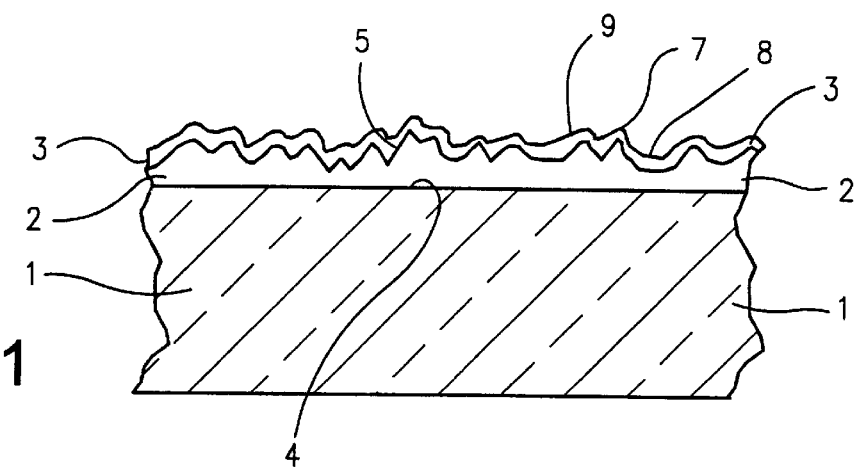
FIG. 1 is a side cross sectional view of a coated article according to an embodiment of this invention, wherein a glass or plastic substrate is provided with a hydrophobic coating thereon including an intermediate layer and a DOC inclusive layer.

Referring now more particularly to the accompanying drawings in which like reference numerals indicate like elements throughout the accompanying views.

Certain embodiments of this invention relate to improving hydrophobic qualities of a coated article (e.g., automotive windshield, automotive backlite, automotive side window, snow-mobile windshield, architectural window, etc.) by providing a degree of surface roughness at the exterior surface of the coated article that is to be exposed to elements such as rain, water, and the like. The provision of this degree of roughness (e.g., via nanostructures which define peaks and/or valleys) causes the contact angle $\theta$ of the coated article to increase or be of a relatively high value.

The effective contact angle for small droplets of liquid such as water (Atomizer principle) is nearly 180 degrees in air. Certain embodiments of this invention take advantage of this by creating an exterior surface of a coated article that has a degree of surface roughness, thereby creating portions of material as well as portions of air (i.e., voids or gaps) at the surface. Moreover, the roughness has an anticapillary effect. Thus, a greater portion of a liquid drop on the exterior surface of the coated article is exposed to air as opposed to solid matter, thereby increasing the contact angle $\theta$. Combining this surface roughness technique with the use of a diamond-like carbon (DOC) layer provided on the base substrate enables the resulting coated article to have a high contact angle $\theta$, and have surface hardness and scratch resistant characteristics sufficient such that the article may be used in automotive and other high exposure environments.

Figure 2:
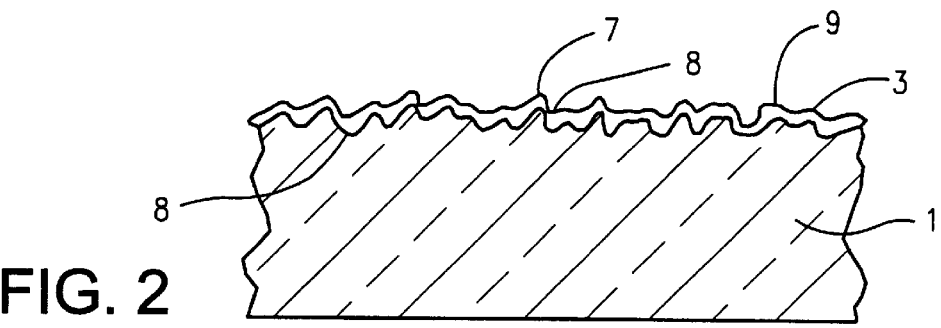
FIG. 2 is a side cross sectional view of a coated article according to another embodiment of this invention, wherein a glass or plastic substrate is provided with a hydrophobic coating thereon including a DOC inclusive layer.
Figure 3:
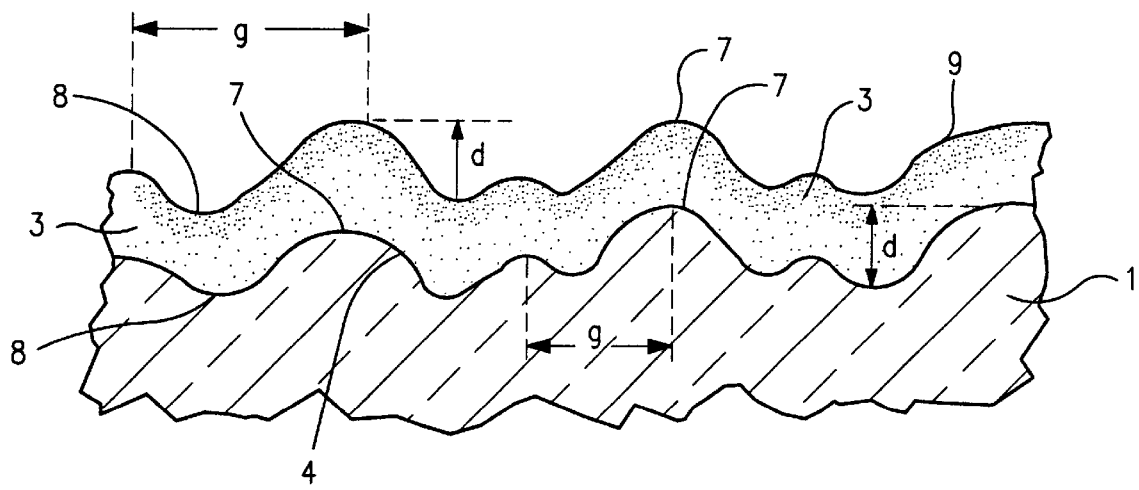
FIG. 3 is an enlarged side cross sectional view of a portion of the article of FIG. 2.
Figure 4:
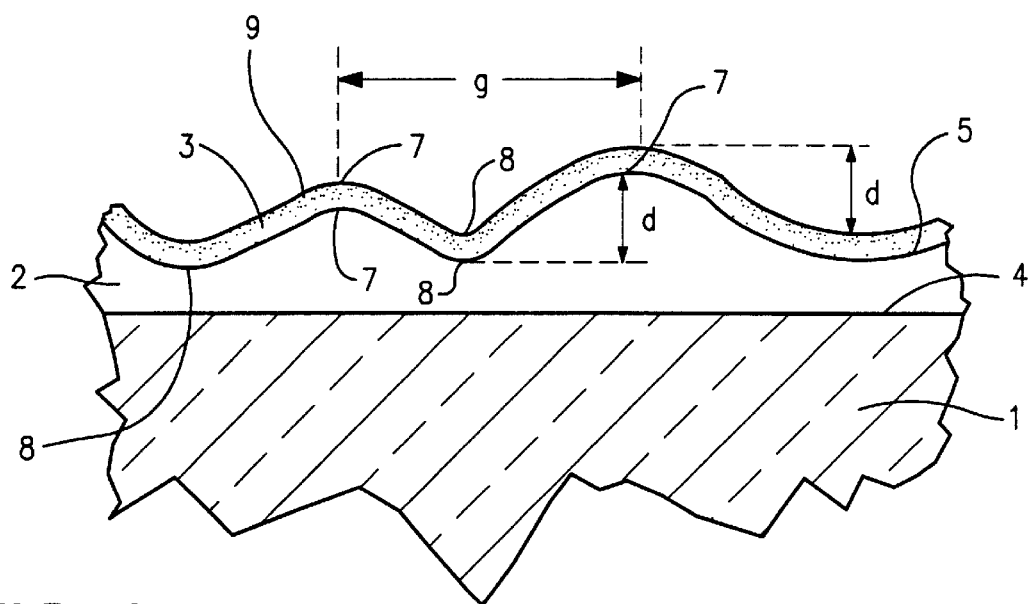
FIG. 4 is an enlarged side cross sectional view of a portion of the article of FIG. 1.

The exterior surface roughness of the coated article may be achieved in different manners. For example, an intermediate layer and a DOC inclusive layer may be provided on a base substrate wherein the surface of the intermediate layer has a degree of roughness at least a portion of which is in turn transferred to the overlying DOC inclusive layer as shown in FIGS. 1 and 4. Alternatively, the surface of the substrate itself may be roughened (e.g., via sand-blasting, rubbing, or any other suitable technique) so that at least a portion of its roughness is transferred to an overlying DOC inclusive layer as shown in FIGS. 2–3. Alternatively, a DOC inclusive layer may be deposited directly or indirectly on a base substrate and thereafter etched, embossed or rubbed so as to create the desired surface roughness. The resulting improved contact angles $\theta$ (and thus hydrophobicity) achieved are illustrated, e.g., in FIG. 6.

The use of surface roughness to enhance hydrophobicity also reduces the need for dopants to be provided in the DOC for hydrophobicity purposes. Dopants often decrease an end product's durability and/or its ability to withstand UV (ultraviolet) exposure. While using surface roughness as explained herein may reduce the need for DOC doping, doping may be employed in certain embodiments of this invention.

FIG. 1 is a side cross-sectional view of a coated article according to an embodiment of this invention, wherein at least one diamond-like carbon (DOC) inclusive protective coating(s) is provided on substrate 1. FIG. 4 is an enlarged cross sectional view of a portion of the coated article of FIG. 1. Substrate 1 may be of glass, plastic, or the like. The coating shown in FIG. 1 includes intermediate layer 2 and one or more DOC inclusive layer(s) 3. Layer 3 includes at least some amount of highly tetrahedral amorphous carbon (ta-C). The coating (2 and 3 combined) functions in a hydrophobic manner (i.e. it is characterized by high water contact angles θ and/or low surface energies as described below). In certain embodiments, the coating may be from about 5–300 nm thick, more preferably from about 10–200 nm thick, and most preferably from about 10–100 nm thick.

Intermediate layer 2 may be of or include nanocrystalline alumina ($Al_2O_3$), $TiO_2$, or any other suitable material capable of having a surface defining a degree of roughness. Nanocrystalline or nanoporous alumina ($Al_2O_3$) is preferred for layer 2 in certain embodiments, because it has an index or refraction close to that of glass substrate 1 and its surface inherently has a desired degree of roughness due to its makeup (i.e., the crystals therein may form a desired degree of surface roughness). In certain embodiments, intermediate layer 2 may be from about 5–300 nm thick, more preferably from about 10–150 nm thick, and most preferably from about 40–60 nm thick.

As shown in FIG. 1, the exterior surface 4 of substrate 1 is generally flat. However, upon application of intermediate layer 2 the exterior surface 5 of layer 2 has a degree of roughness as illustrated by the peaks and valleys (i.e., nanostructures) therein. Peaks 7 may be sharp or significantly rounded in different embodiments of this invention, as may valleys 8. The roughness of the exterior surface 5 of intermediate layer 2 is defined by the elevations "d" of peaks 7 relative to adjacent valleys 8, and by the gaps "g" between adjacent peaks or adjacent valleys. On surface 5 of layer 2, the average elevation value "d" in certain embodiments is from about 5–60 nm, more preferably from about 10–50 nm, and most preferably from about 20–35 nm. On surface 5 of layer 2, the average gap distance "g" between adjacent peaks or adjacent valleys in certain embodiments is from about 10–80 nm, more preferably from about 20–60 nm, and most preferably from about 20–50 nm. The resulting nanomorphology is depicted in FIGS. 1 and 4. The roughness (i.e., peaks and valleys) may be randomly distributed across surface(s) 5, 9 in certain embodiments, and may be approximately uniformly distributed in other embodiments. Moreover, roughness of these degrees/sizes allows good light transmission through the coated article because the nanostructures (e.g., peaks and valleys) are smaller than certain wavelengths of visible light so that the light is not substantially scattered as it passes therethrough.

Because of the methodology utilized to deposit DOC inclusive layer 3 on intermediate layer 2 (described in more detail below), layer 3 is grown in a fairly uniform manner (i.e., the material in layer 3 does not tend to collect only in the valleys 8 of layer 2 during the deposition process, due to the energy and/or directionality utilized during the ion beam deposition of layer 3) on top of layer 2 so that the peaks 7 and valleys 8 defined in the exterior surface 5 of intermediate layer 2 are in turn at least partially transferred in approximately the same or similar form to DOC inclusive layer 3. Thus, the exterior surface 9 of layer 3 defines peaks and valleys similar to those defined by the exterior surface of layer 2. In other words, the thickness of layer 3 is approximately the same (plus/minus about 10–30% or less) across the entire exterior surface 5 of intermediate layer 2.

On exterior surface 9 of hydrophobic layer 3, the average peak 7 elevation value "d" in certain embodiments is from about 5–60 nm, more preferably from about 10–50 nm, and most preferably from about 20–35 nm. On surface 9 of layer 3, the average gap distance "g" between adjacent peaks or adjacent valleys in certain embodiments is from about 10–80 nm, more preferably from about 20–60 nm, and most preferably from about 20–50 nm. In certain embodiments, DOC inclusive layer 3 is deposited to a thickness of from about 3–50 nm, more preferably from about 4–30 nm, and most preferably from about 5–15 nm thick. In certain embodiments, the exterior surface of the coated article may have a fractal dimension of from about 1.5 to 1.7 so as to reduce surface energy thereby increasing hydrophobicity.

In certain embodiments, DOC inclusive hydrophobic layer 3 may have an approximately uniform distribution of $sp^3$ carbon-carbon bonds throughout a large portion of its thickness, so that much of layer 3 has approximately the same density. In other embodiments, hydrophobic layer 3 may include a lesser percentage of $sp^3$ carbon-carbon bonds near the interface with intermediate layer 2, with the percentage or ratio of $sp^3$ carbon-carbon bonds increasing throughout at least a portion of the thickness of the layer 3 toward the outermost surface. Thus, layer 3 may include at least one interfacing portion directly adjacent layer 2, this interfacing layer having a lesser density and a lesser percentage of $sp^3$ carbon-carbon bonds than the middle portion of DOC inclusive layer 3.

In certain embodiments, it is desired to keep number of $sp^2$ carbon-carbon bonds in layer 3 to no greater than about 50%, more preferably no greater than about 30%, and most preferably from about 0–25%, as these type bonds are hydrophilic in nature and attract water and the like. Thus, in preferred embodiments, at least about 50% (more preferably at least about 75%, and most preferably at least about 90%) or the carbon-carbon bonds in layer 3 are of the $sp^3$ carbon-carbon type. In certain embodiments, the DOC of layer 3 is not doped, while in other embodiments it may be doped (e.g., with H, Si, O, and/or F). In certain preferred embodiments, the DOC of layer 3 may be doped only with H as will be described more fully below.

The presence of $sp^3$ carbon-carbon bonds in layer 3 increases the density and hardness of the layer, thereby enabling it to satisfactorily function in automotive environments. In certain embodiments, taking only a thin layer portion of, or alternatively the entire thickness of, layer 3 into consideration, at least about 15% (more preferably at least about 25%, and most preferably at least about 50%) of the total bonds are $sp^3$ carbon-carbon (C—C). Other types of bonds in the layer may include, for example, $sp^2$ C—C bonds, C—H bonds, and the like.

In order to improve the hydrophobic nature of coating 3, atoms other than carbon (C) may be provided in layer 3 in different amounts in different embodiments. For example, in certain embodiments of this invention layer 3 (taking the entire layer thickness, or only a thin 10 Å (1 nm) thick layer portion thereof into consideration) may include in addition to the carbon atoms of the $sp^3$ carbon-carbon bonds, by atomic percentage, at least about 5% silicon (Si) atoms, at least about 5% oxygen (O) atoms, and/or at least about 5% hydrogen (H) atoms.

In certain preferred embodiments, at least a portion of layer 3 may include DOC as discussed above, and at least about 10% H, and most preferably at least about 15% H. As illustrated in FIGS. 1 and 4 by the increased density of the dots near the exterior surface 9 of layer 3, the number of H atoms may be increased toward the exterior surface 9 of DOC inclusive layer 3. In other embodiments, the percentage of H atoms may be approximately uniform through the entire thickness of layer 3.

In embodiments where a larger number or percentage of H atoms is provided near the exterior surface 9 of layer 3, at least some of these H atoms may be deposited via plasma ion beam treatment after much of layer 3 has already been formed. The additional H atoms near the surface of layer 3 may reduce the number of polar bonds at the layer's surface, thereby improving the article's hydrophobic properties by reducing the polar component of the surface energy. For example, in certain embodiments the outermost 10 angstrom (A) portion of layer 3 may include at least about 10% H atoms, more preferably at least about 20% H atoms, and most preferably at least about 30% H atoms. The provision of these H atoms near the coating's surface results in a more passive or non-polar coating surface. It is noted that deposition of the H atoms near the layer's surface may tend to etch away $sp^2$ or graphite C—C bonds in that area. This increase in H near the layer's surface also decreases the coating's density at this outermost 5 A layer portion. The rest of layer 3 (i.e., the middle of layer 3 and/or the portion of layer 3 adjacent layer 2) may be of or include undoped DOC in certain embodiments, or alternatively may be of or include DOC doped with Si, O, H, F, B and/or any other suitable material in other embodiments.

The combination of layer 3 and the surface roughness defined on the exterior surface 9 of the coated articles shown in any of FIGS. 1–4 enables high contact angles θ to be achieved (and thus hydrophobic characteristics). Coated articles (and thus layer(s) 3) herein having surface roughness with "d" and/or "g" as described above may have an is initial (i.e. prior to being exposed to environmental tests, rubbing tests, acid tests, UV tests, or the like) water contact angle θ of at least about 100 degrees, more preferably of at least about 120 degrees, even more preferably of at least about 130 degrees, and most preferably of at least about 145 degrees. The article's initial contact angle θ may be as high as 175 degrees in certain embodiments. In certain embodiments the article's contact angle may increase over time upon exposure to environmental elements while in other embodiments the article's contact angle may decrease over time upon such exposure. Such high contact angles may result in, effectively, a self-cleaning type of coated article.

In certain preferred embodiments, layer 3 has an average hardness of at least about 10 GPa, more preferably at least about 20 GPa, and most preferably from about 20–50 GPa. Such hardness renders layer 3 resistant to scratching, solvents, and the like. It is noted that the hardness and density of layer 3 may be adjusted by varying the ion energy of the depositing apparatus or process described below.

FIG. 2 is a side cross sectional view of a coated article according to another embodiment of this invention, including substrate 1 (e.g., glass), and at least one hydrophobic DOC inclusive coating layer(s) 3 as described above with regard to the FIG. 1, 4 embodiment. An enlarged portion of the FIG. 2 coated article is illustrated in FIG. 3. The difference between this embodiment of FIGS. 2–3, and the embodiment of FIGS. 1 and 4, is that the underlying surface roughness is provided on the exterior surface 4 of substrate 1 instead of by an intermediate layer. The peaks 7 and valleys 8 defining the roughness on the surface of substrate 1 may be created by sand-blasting the surface of substrate 1 with fine particle of sand or any other suitable material, by rubbing, and/or by etching/embossing. After the roughness has been formed/created in the exterior surface 4 of substrate 1, DOC inclusive layer 3 (e.g., doped or undoped) may be formed thereon as described above in a manner similar to that of the FIG. 1, 4 embodiment. In the FIGS. 2–3 embodiment, surfaces 4 and 9 have the same degrees of roughness (see parameters "d" and "g") as those described above in the FIG. 1, 4 embodiment relative to surfaces 5 and 9, respectively.

In any of the embodiments of FIGS. 1–4, a low-E or other coating or layer system (not shown) may be provided between substrate 1 and the hydrophobic DOC inclusive layer 3. However, layer 3 is still "on" substrate 1. The term "on" (with regard to a layer being "on" a substrate or other layer) herein means supported by, regardless of whether or not other layer(s) are provided therebetween. Thus, for example, DOC inclusive layer 3 may be provided directly on substrate 1 as shown in FIGS. 2–3, or may be provided on substrate 1 with a low-E or other layer(s) (e.g., intermediate roughness creating layer 2) therebetween.

Exemplary layer systems (in full or any portion of these coatings) that may be used as low-E or other coating(s) on substrate 1 between layer 3 and the substrate are shown and/or described in any of U.S. Pat. Nos. 5,837,108, 5,800, 933, 5,770,321, 5,557,462, 5,514,476, 5,425,861, 5,344,718, 5,376,455, 5,298,048, 5,242,560, 5,229,194, 5,188,887 and 4,960,645, which are all hereby incorporated herein by reference.

Highly tetrahedral amorphous carbon (ta-C) forms $sp^3$ carbon-carbon bonds, and is a special form of diamond-like carbon (DOC). The amount of $sp^3$ bonds may be measured using Raman finger-printing and/or electron energy loss spectroscopy. A high amount of sp bonds increases the density of a layer, thereby making it stronger and allowing it to reduce soda diffusion to the surface of the coated article. However, in certain embodiments, there is a lesser percentage of such bonds at the outmost layer portion of layer 3 than at middle areas of the layer, so that H atoms may be provided in order to improve the layer's hydrophobic characteristics.

In certain embodiments, DOC inclusive layer 3 and/or the coating system on substrate 1 is/are at least about 75% transparent to or transmissive of visible light rays, preferably at least about 85%, and most preferably at least about 95%.

When substrate 1 is of glass, it may be from about 1.5 to 5.0 mm thick, preferably from about 2.3 to 4.8 mm thick, and most preferably from about 3.7 to 4.8 mm thick. Conventional soda lime silica glass may be used as substrate 1 in certain embodiments, such glass being commercially available from Guardian Industries, Corp., Auburn Hills, Mich. In certain other embodiments of this invention, substrate 1 may be of borosilicate glass, or of substantially transparent plastic. In still further embodiments, an automotive window (e.g. windshield, backlite, or side window) including any of the above glass substrates laminated to a plastic substrate may combine to make up substrate 1, with a coating system of any of FIGS. 1–4 provided on the outside surface of such a substrate to form the window. In other embodiments, substrate 1 may include first and second glass sheets of any of the above mentioned glass materials laminated to one another, for use in window (e.g. automotive windshield, residential window, commercial architectural window, automotive side window, vacuum IG window, automotive backlite or back window, etc.) and other similar environments.

When substrate 1 of any of the aforesaid materials is coated with at least DOC inclusive layer 3 according to any of the FIGS. 1–4 embodiments, the resulting coated article has the following characteristics in certain embodiments: visible transmittance (Ill. A) greater than about 60%

(preferably greater than about 70%, and most preferably greater than about 80%), UV (ultraviolet) transmittance less than about 38%, total solar transmittance less than about 45%, and IR (infrared) transmittance less than about 35% (preferably less than about 25%, and most preferably less than about 21%). Visible, "total solar", UV, and IR transmittance measuring techniques are set forth in U.S. Pat. No. 5,800,933.

Figure 5:
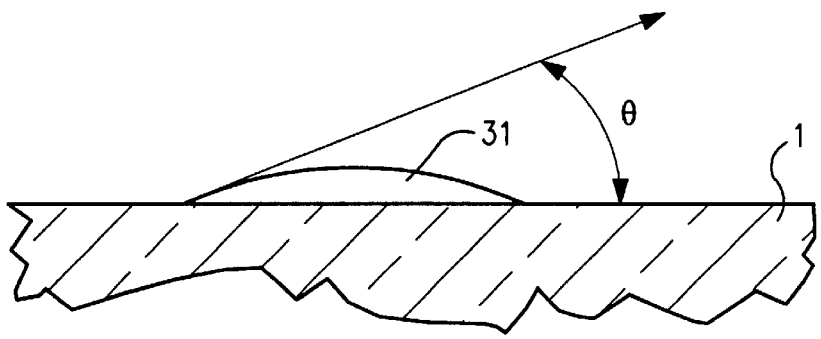
FIG. 5 is a side cross sectional partially schematic view illustrating a low contact angle $\theta$ of a drop on an uncoated glass substrate.
Figure 6:
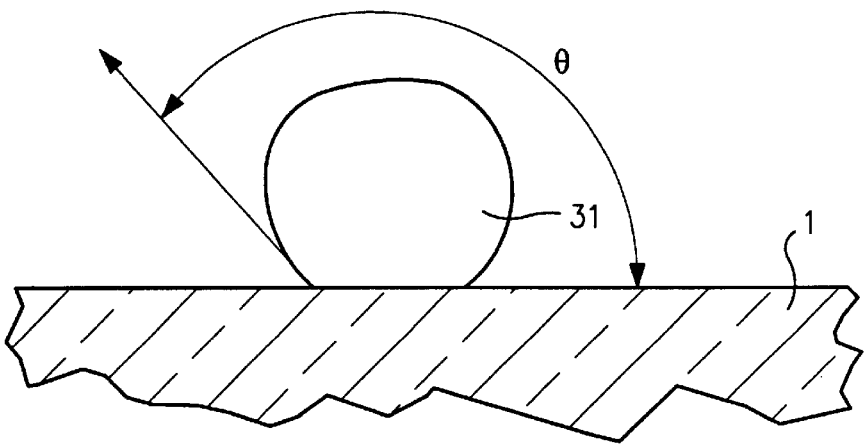
FIG. 6 is a side cross sectional partially schematic view illustrating the coated article of any of the FIGS. 1–4 embodiments and the contact angle $\theta$ of a water drop thereon.

Hydrophobic performance of coating 3 in any of the above embodiments is a function of contact angle θ, surface energy γ, and wettability or adhesion energy W. The surface energy γ of layer 3 or any other surface may be calculated by measuring its contact angle θ. Contact angle θ is illustrated in FIGS. 5–6. The coatings described above are provided on the substrate 1, but are not shown in FIG. 6 for purposes of simplicity; while no coatings are provided on the uncoated glass substrate 1 of FIG. 5. To measure contact angle, a sessile drop 31 of a liquid such as water is placed on the substrate as shown in FIGS. 5–6. A contact angle θ between the drop 31 and underlying article appears, defining an angle θ depending upon the interface tension between the three phases at the point of contact. The contact angle is greater in FIG. 6 than in FIG. 5, due to this invention.

Generally, the surface energy $\gamma_c$ of a layer 3 or any other article/layer can be determined by the addition of a polar and a dispersive component, as follows: $\gamma_c = \gamma_{CP} + \gamma_{CD}$, where $\gamma_{CP}$ is the layer's/coating's polar component and $\gamma_{CD}$ the layer's/coating's dispersive component. The polar component of the surface energy represents the interactions of the surface mainly based on dipoles, while the dispersive component represents, for example, van der Waals forces, based upon electronic interactions. Generally speaking, the lower the surface energy $\gamma_c$ of layer 3, the more hydrophobic the layer (and coated article) and the higher the contact angle θ.

Adhesion energy (or wettability) W can be understood as an interaction between polar with polar, and dispersive with dispersive forces, between the exterior surface 9 of the coated article and a liquid thereon such as water. $\gamma^P$ is the product of the polar aspects of liquid tension and article tension; while $\gamma^D$ is the product of the dispersive forces of liquid tension and article tension. In other words, $\gamma^P = \gamma_{LP} \cdot \gamma_{CP}$; and $\gamma^D = \gamma_{LD} \cdot \gamma_{CD}$; where $\gamma_{LP}$ is the polar aspect of the liquid (e.g. water), $\gamma_{CP}$ is the polar aspect of coating/layer 3; $\gamma_{LD}$ is the dispersive aspect of liquid (e.g. water), and $\gamma_{CD}$ is the dispersive aspect of coating/layer 3. It is noted that adhesion energy (or effective interactive energy) W, using the extended Fowkes equation, may be determined by:

$$W = [\gamma_{LP} \cdot \gamma_{CP}]^{1/2} + [\gamma_{LD} \cdot \gamma_{CD}]^{1/2} = \gamma_1(1+\cos\theta),$$

where $\gamma_1$ is liquid tension and θ is the contact angle. W of two materials (e.g. layer 3 and water thereon) is a measure of wettability indicative of how hydrophobic the layer or coated article is.

When analyzing the degree of hydrophobicity of layer 3 or a coated article herein with regard to water, it is noted that for water $\gamma_{LP}$ is 51 mN/m and $\gamma_{LD}$ is 22 mN/m. In certain embodiments of this invention, the polar aspect $\gamma_{CP}$ of surface energy of layer 3 is from about 0 to 0.2 (more preferably variable or tunable between 0 and 0.1) and the dispersive aspect $\gamma_{CD}$ of the surface energy of layer 3 is from about 16–22 mN/m (more preferably from about 16–20 mN/m).

Using the above-listed numbers, according to certain embodiments of this invention, the surface energy $\gamma_C$ of layer 3 is less than or equal to about 20.2 mN/m, more preferably less than or equal to about 19.5 mN/m, and most preferably less than or equal to about 18.0 mN/m; and the adhesion energy W between water and layer 3 is less than about 25 mN/m, more preferably less than about 23 mN/m, even more preferably less than about 20 mN/m, and most preferably less than about 19 mN/m. These low values of adhesion energy W and layer 3 surface energy $\gamma_C$, and the high initial contact angles θ achievable, illustrate the improved hydrophobic nature of coated articles according to different embodiments of this invention.

The initial contact angle θ of a conventional glass substrate 1 with sessile water drop 31 thereon is typically from about 22–24 degrees, as illustrated in FIG. 5. Thus, conventional glass substrates are not particularly hydrophobic in nature. The provision of roughness and layer 3 as described above on substrate 1 causes the contact angle θ to increase to the angles discussed above, as shown in FIG. 6 for example, thereby improving the hydrophobic nature of the article. As discussed in Table 1 of commonly owned 09/303, 548, the contact angle θ of a ta-C DOC layer is typically from about 5 to 50 degrees. However, the makeup of DOC-inclusive layer 3 and the roughness described herein enables the initial contact angle θ between layer 3 and a water drop (i.e. sessile drop 31 of water) to be increased as discussed herein.

Figure 7:
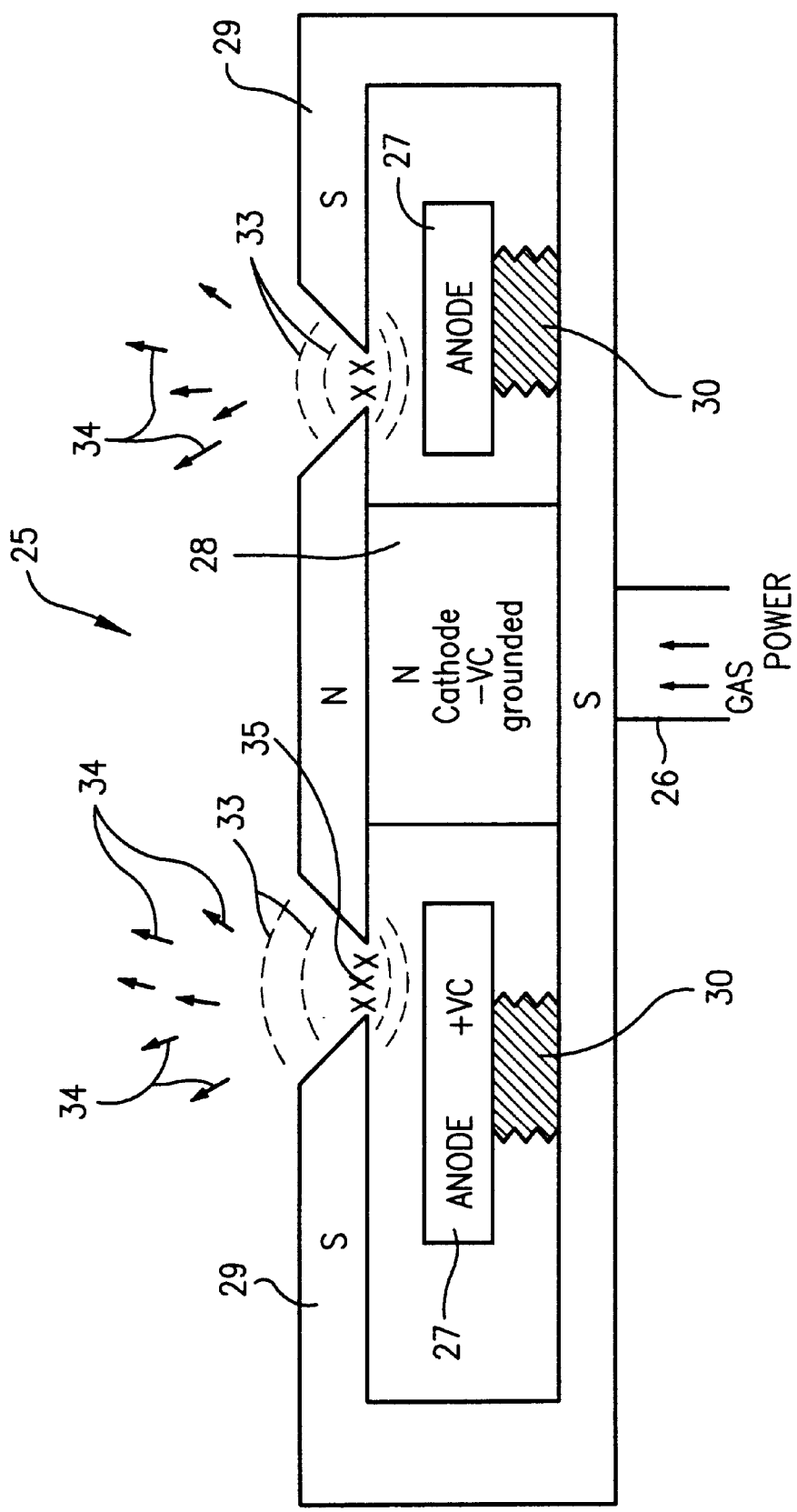
FIG. 7 is a side cross sectional view of a linear ion beam source which may be used in any embodiment of this invention for depositing a DOC inclusive layer(s).
Figure 8:
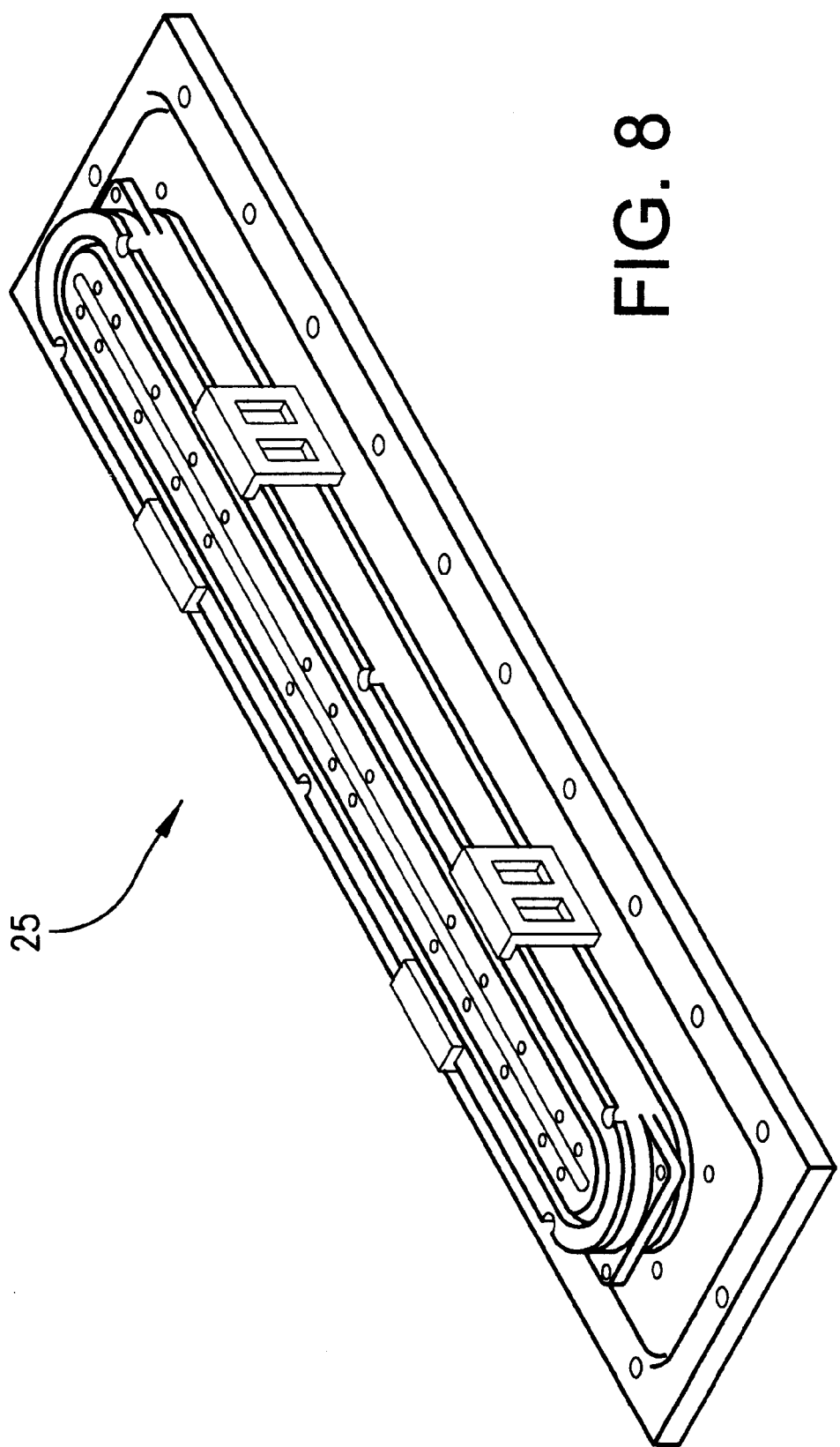
FIG. 8 is a perspective view of the linear ion beam source of FIG. 7.

FIGS. 7–8 illustrate an exemplary linear or direct ion beam source 25 which may be used to deposit layer(s) 3, clean a substrate 1, or surface plasma treat a DOC inclusive layer to add H and/or other atoms thereto according to different embodiments of this invention. Ion beam source 25 includes gas/power inlet 26, anode 27, grounded cathode magnet portion 28, magnet poles 29, and insulators 30. A 3 kV DC power supply may be used for source 25 in some embodiments. Linear source ion deposition allows for substantially uniform deposition of DOC inclusive layer 3 as to thickness and stoichiometry.

Ion beam source 25 is based upon a known gridless ion source design. The linear source is composed of a linear shell (which is the cathode and grounded) inside of which lies a concentric anode (which is at a positive potential). This geometry of cathode-anode and magnetic field 33 gives rise to a close drift condition. The magnetic field configuration further gives rise to an anode layer that allows the linear ion beam source to work absent any electron emitter. The anode layer ion source can also work in a reactive mode (e.g., with oxygen and/or nitrogen). The source includes a metal housing with a slit in a shape of a race track as shown in FIGS. 7–8. The hollow housing is at ground potential. The anode electrode is situated within the cathode body (though electrically insulated) and is positioned just below the slit. The anode can be connected to a positive potential as high as 3,000 volts. Both electrodes may be water cooled in certain embodiments.

Feedstock gases are fed through the cavity between the anode and cathode. The linear ion source also contains a labyrinth system that distributes the precursor gas evenly along its length and which allows it to supersonically expand between the anode-cathode space internally. The electrical energy then cracks the gas to produce a plasma within the source. The ions are expelled out and directed toward the substrate on which the layer(s) is to be grown. The ion beam emanating from the slit is approximately uniform in the longitudinal direction and has a gaussian profile in the transverse direction. Exemplary ions 34 are shown in FIG. 7. A linear source as long as 0.5 to 3 meters may be made and used, although sources of different lengths are anticipated in different embodiments of this invention. Electron layer 35 is shown in FIG. 7 and completes the circuit thereby enabling the ion beam source to function properly.

An exemplary method of depositing a DOC inclusive layer 3 over top of and on a substrate 1 (the substrate may have other layer(s) (e.g., layer 2) already provided thereon) will now be described. This method is for purposes of example only. The energies used during the deposition process of layer 3 and the directionality provided by the ion beam deposition techniques enable layer 3 to be fairly uniformly deposited over all aspects of the underlying structure so that roughness defined by the underlying structure is transferred to the layer 3 and thus the end product as shown in FIGS. 1–4.

Prior to layer 3 being formed on substrate 1, the top surface of substrate 1 may be cleaned by way of a first linear or direct ion beam source. For example, a glow discharge in argon (Ar) gas or mixtures of $Ar/O_2$ (alternatively $CF_4$ plasma) may be used by the source to remove any impurities on the substrate surface. Such interactions are physiochemical in nature. Substrate 1 may also be cleaned by, for example, sputter cleaning the substrate prior to actual deposition of coating 3; using oxygen and/or carbon atoms at an ion energy of from about 800 to 1200 eV, most preferably about 1,000 eV. While cleaning may be performed in some embodiments, it need not be performed in other embodiments of this invention.

Intermediate layer 2 (e.g., of alumina) may be deposited as follows. Using a sol gel process, an Al compound (e.g., aluminum/tri/sec/butoxide) is mixed with fluids such as water, isopropyl alcohol, and/or ethanoate. This solution is then formed on the substrate (e.g., the substrate 1 may be dipped in the solution). Thereafter, the coated substrate may be heated (e.g., to about 350–500 degrees C) to evaporate the liquids thereby leaving the alumina layer 2 with roughened exterior surface 5 on substrate 1. The heating may be for, e.g., about 4–10 minutes in certain embodiments. Any other suitable method (e.g., ion beam deposition) may instead be used to deposit layer 2. The substrate with layer 2 thereon may optionally be cleaned.

Then, the deposition process for DOC inclusive layer 3 begins over the roughened structure of layer 2 using a linear ion beam deposition technique via an ion beam source (e.g., see 25). The layer 3 ion beam source 25 (which may be different than the cleaning ion beam source) functions to deposit a ta-C inclusive layer 3 (preferably hydrogenated; i.e., including H atoms) on substrate 1, as follows. A dopant gas may be produced by bubbling a carrier gas (e.g. $C_2H_2$) through the precursor monomer (e.g. TMS or 3MS) held at about 70 degrees C (well below the flashing point). Acetylene feedstock gas ($C_2H_2$) is used in certain embodiments to prevent or minimize/ reduce polymerization and to obtain an appropriate energy to allow the carbon and/or hydrogen ions to penetrate the article and subimplant therein, thereby causing the layer 3 to grow. Other suitable cases may instead be used in the source to create the ions 34. The actual gas flow may be controlled by a mass flow controller (MFC) which may be heated to about 70 degrees C. The temperature of substrate 1 may be room temperature; an arc power of about 1000 W may be used; precursor gas flow may be about 25 sccm; the base pressure may be about $10^{-6}$ Torr, and a Hoescht type carbon electrode may be used. C and/or H ions 34 are directed toward and onto the substrate to form layer 3.

The optimal ion energy window for layer 3 is from about 15–500 eV (preferably from about 20–200 eV, and most preferably about 150 eV) per carbon ion. When $C_2H_2$ feedstock gas is used, this means that each molecule of incoming gas has two carbon atoms so that the total ion energy would be twice that listed above. At these energies, the carbon in layer 3 emulates diamond, and $sp^3$ C—C bonds form in layer 3. These energies also allow the layer 3 to be grown rather uniformly on the roughened structure so that it does not unduly collect in canyons/crevices 8 of the underlying surface. However, compressive stresses can develop in ta-C when being deposited at 100–150 eV. In certain embodiments, stress can be controlled and decreased by increasing the ion energy during the deposition process to a range of from about 200–1,000 eV. The plasma ion beam source enables ion energy to be controlled within different ranges in an industrial process for large area deposition utilized herein. Different ion energies, or the same ion energy, may be used throughout the formation of layer 3. The result is layer 3 and the coated articles shown in, e.g., FIGS. 1–4.

While direct ion beam deposition techniques are preferred in certain embodiments, other methods of deposition may also be used in different embodiments. For example, filtered cathodic vacuum arc ion beam techniques may be used to deposit layers 2 and/or 3. Also, in certain embodiments, $CH_4$ may be used as a feedstock gas during the deposition process instead of or in combination with the aforesaid $C_2H_2$ gas. Alternatively, any of the deposition methods disclosed in U.S. Pat. No. 5,858,477 may be used to deposit layer 3, the disclosure of U.S. Pat. No. 5,858,477 hereby being incorporated herein by reference.

Hydrogen or other doping material may be deposited along with the ta-C during the formation of layer 3. In certain embodiments, yet another linear ion beam source 25 may be used to deposit H atoms into/onto the exterior portion of layer 3 to hydrogenate the outer portion of layer 3 in order to improve the layer's hydrophobic characteristics. This may remove certain polar functional groups at the outermost surface or portion of layer 3, thereby altering the surface chemical reactivity (i.e. lowering surface energy) while the bulk of layer 3 remains the same or substantially unaffected. After a conveyor has moved the DOC-coated substrate to a position under the another linear ion beam source, the plasma treatment by that source introduces hydrogen (H) atoms into the outermost surface of coating 3, thereby making the coating's surface substantially non-polar and less dense than the rest of the layer 3. These H atoms are introduced, because $H_2$ or $ArH_2$ feedstock gas is used by this source 25. Thus, this source need not deposit any significant amounts of C; but instead treats the outermost surface of the ta-C inclusive layer by adding H atoms thereto in order to improve its hydrophobic characteristics.

Figure 9:
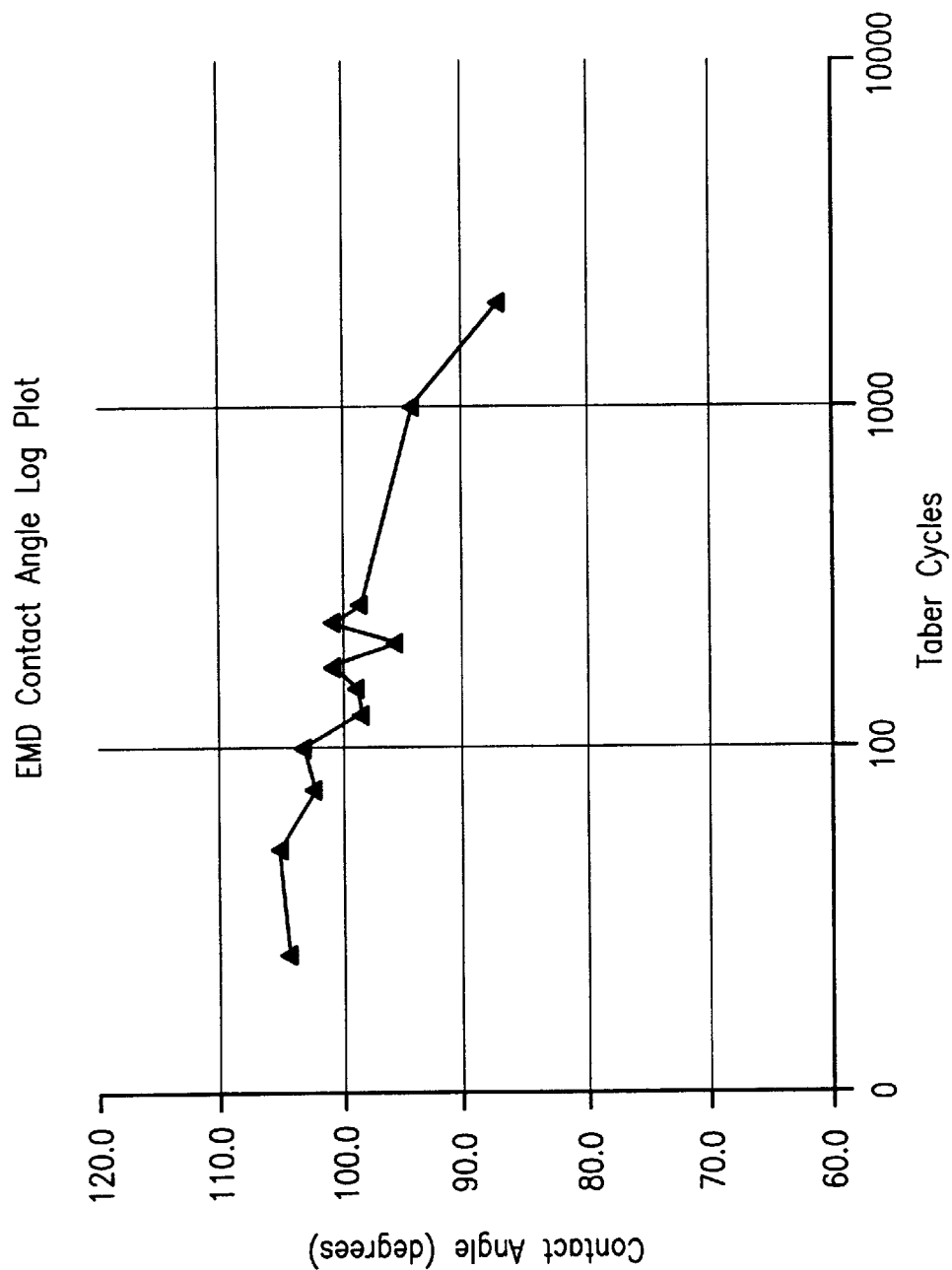
FIG. 9 is a taber cycles versus contact angle graph illustrating how a DOC inclusive layer (not on a roughened surface and not having a roughened surface) retains contact angle over time upon exposure to more and more taber rubbing cycles.

In certain embodiments of this invention, the coated articles described herein, and thus layer 3, have/has a contact angle of at least about 70 degrees, more preferably at least about 80 degrees, and even more preferably at least about 100 degrees after a taber abrasion resistance test has been performed pursuant to ANSI Z26.1. The test utilizes, e.g., 1,000 rubbing cycles of the coated article. The purpose of this abrasion resistance test is to determine whether the coated article is resistive to abrasion (e.g. whether hazing is less than 4% afterwards). ANSI Z26.1 is hereby incorporated into this application by reference. FIG. 9 illustrates how coated articles including DOC inclusive layer 3 retain their contact angle after many taber abrasion cycles.

While DOC is discussed above as a preferred material for use in certain embodiments of this invention, it is noted that other materials may instead be used in combination with the roughness defined herein.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of making a coated article, the method comprising:

providing a glass substrate; and ion beam depositing an amorphous layer comprising diamond-like carbon (DOC) on the substrate so that the amorphous layer has a surface roughness defined by peaks and valleys, wherein the peaks at the exterior surface of the amorphous layer have an average height "d" of from about 5–60 nm.

2. The method of claim 1, wherein the layer comprises $sp^3$ carbon-carbon bonds, and has an average hardness of at least about 10 GPa, and wherein the layer is at least 75% transparent to visible light rays.

3. The method of claim 2, wherein at least 50% of the carbon-carbon bonds in the layer are $sp^3$ carbon-carbon bonds.

4. The method of claim 1, wherein the layer has an initial contact angle θ with a sessile drop of water of at least 100 degrees due at least to the surface roughness.

5. The method of claim 1, wherein the peaks at the exterior surface of the layer have an average height "d" of from about 10–50 nm.

6. The method of claim 1, wherein the peaks at the exterior surface of the layer have an average height "d" of from about 20–35 nm.

7. The method of claim 1, wherein on the surface of the layer the average distance "g" between adjacent peaks is from about 10–80 nm.

8. The method of claim 7, wherein on the surface of the layer the average distance "g" between adjacent peaks is from about 20–60 nm.

9. The method of claim 1, wherein the layer has an average hardness of at least about 20 GPa, and wherein the layer is at least 75% transmissive of visible light rays.

* * * * *

UNITED STATES PATENT AND TRADEMARK OFFICE
CERTIFICATE OF CORRECTION

PATENT NO. : 6,491,987 B2
DATED : December 10, 2002
INVENTOR(S) : Veerasamy

It is certified that error appears in the above-identified patent and that said Letters Patent is hereby corrected as shown below:

<u>Title page,</u>
Item [73], Assignee, should be -- Guardian Industries Corp. --

<u>Column 13,</u>
Line 9, "(DOC)" should be -- (DLC) --

Signed and Sealed this

Eighth Day of April, 2003

JAMES E. ROGAN
*Director of the United States Patent and Trademark Office*